(12) United States Patent  (10) Patent No.: US 7,606,451 B2
Morita                    (45) Date of Patent:     Oct. 20, 2009

(54) OPTICAL COMMUNICATION SYSTEM, OPTICAL READER, AND METHOD OF READING INFORMATION

(75) Inventor: Tadashi Morita, Tokyo (JP)

(73) Assignee: Sony Corporation, Tokyo (JP)

( * ) Notice: Subject to any disclaimer, the term of this patent is extended or adjusted under 35 U.S.C. 154(b) by 406 days.

(21) Appl. No.: 11/716,713

(22) Filed: Mar. 12, 2007

(65) Prior Publication Data
US 2007/0230322 A1    Oct. 4, 2007

(30) Foreign Application Priority Data
Mar. 28, 2006    (JP)    ............... 2006-089009

(51) Int. Cl.
    G02B 6/28    (2006.01)
(52) U.S. Cl. .......................... 385/24; 385/15
(58) Field of Classification Search ........... 385/15, 385/24
    See application file for complete search history.

(56) References Cited

U.S. PATENT DOCUMENTS

| 4,916,296 | A | 4/1990 | Streck |
| 5,241,161 | A | 8/1993 | Zuta |
| 6,970,916 | B1 * | 11/2005 | Philyaw ..................... 709/217 |
| 7,492,490 | B2 * | 2/2009 | Silverbrook ............... 358/474 |

FOREIGN PATENT DOCUMENTS

| EP | 1 531 341 | 5/2005 |
| JP | 01-276086 | 11/1989 |
| JP | 2000-101578 | 4/2000 |
| JP | 2003-060516 | 2/2003 |
| JP | 2006-011948 | 1/2006 |
| JP | 2006-11948 | 12/2006 |

OTHER PUBLICATIONS

Japanese Office Action issued May 7, 2009 for corresponding Japanese Application No. 2006-089009.
European Patent Office; Application No./Patent No. 07105102.3 - 2210.

* cited by examiner

Primary Examiner—Jennifer Doan
(74) Attorney, Agent, or Firm—Rader, Fishman & Grauer PLLC; Christopher M. Tobin

(57) ABSTRACT

An optical communication system includes at least one optical ID tag and at least one optical reader. Identification information is communicated between the optical ID tag and the optical reader using light as a communication medium. The optical ID tag includes storing units for storing the identification information; reflecting units for reflecting incident light in the incident direction; and modulating units for modulating reflected light on the basis of the identification information stored in the storing units. The optical reader includes random number generating units for generating a random number; emitting units for emitting light having an oscillation frequency specific to the generated random number; photoelectric conversion units for performing photoelectric conversion to the reflected light incident in the emitting direction; extracting units for extracting a signal component having the oscillation frequency from the signal resulting from the photoelectric conversion; and demodulating units for demodulating the signal component.

8 Claims, 9 Drawing Sheets

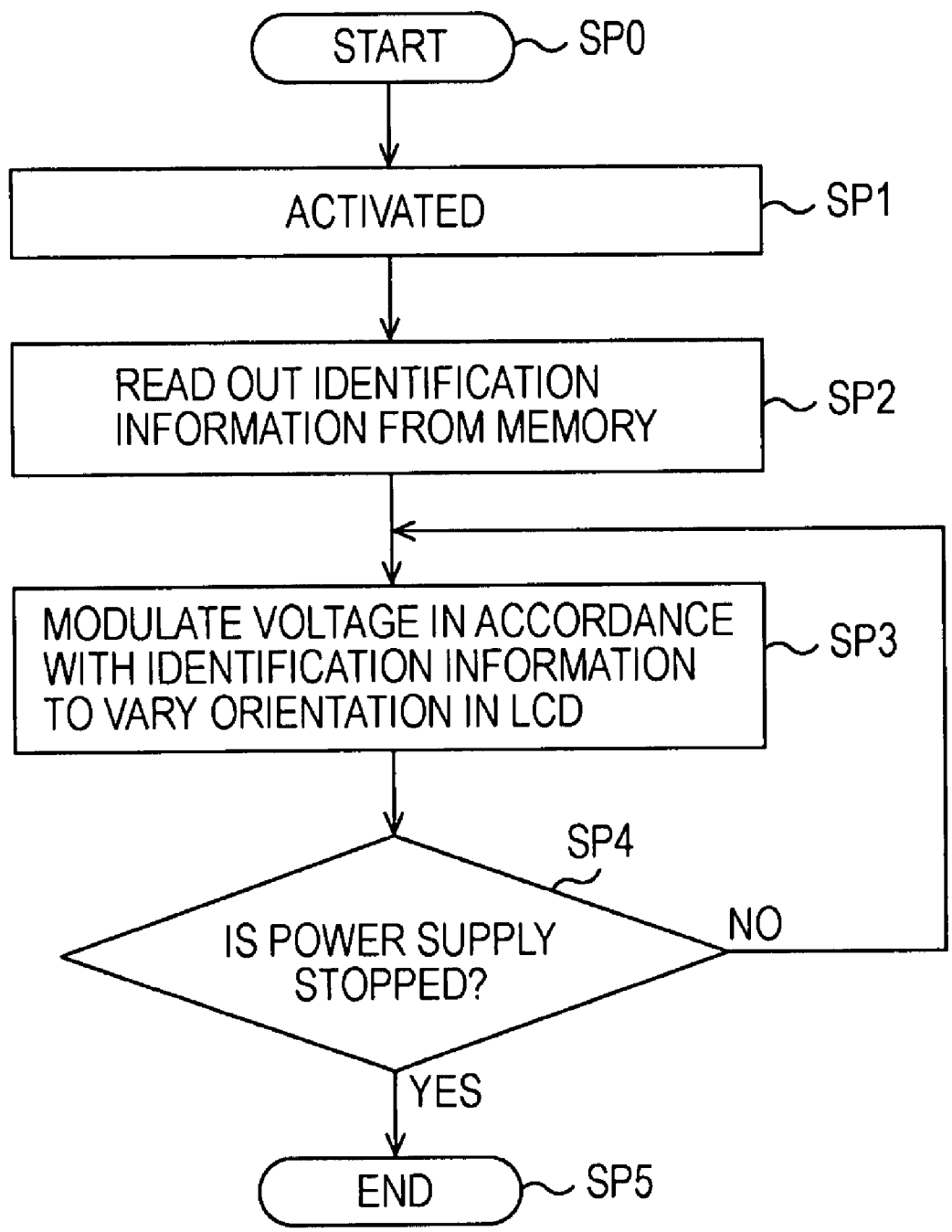

OPTICAL COMMUNICATION SYSTEM, OPTICAL READER, AND METHOD OF READING INFORMATION

CROSS REFERENCES TO RELATED APPLICATIONS

The present invention contains subject matter related to Japanese Patent Application JP 2006-089009 filed in the Japanese Patent Office on Mar. 28, 2006, the entire contents of which are incorporated herein by reference.

BACKGROUND OF THE INVENTION

1. Field of the Invention

The present invention relates to an optical communication system, an optical reader, and a method of reading information. The present invention is preferably applied to reading of identification information from compact wireless IC chips.

2. Description of the Related Art

Recently, radio frequency identification (RFID) has gained attention as a technology of identifying or managing articles, with which barcodes are replaced.

In RFID, identification information specific to articles is stored in a compact wireless device called a wireless IC tag (or wireless IC chip) and the articles are identified or managed on the basis of the identification information.

Various readers for reading identification information from wireless IC tags or wireless signals transmitted from wireless IC tags have been proposed. Some readers perform optical communication with wireless IC tags to transmit and receive identification information (for example, Japanese Unexamined Patent Application Publication No. 2006-11948).

In the technology disclosed in Japanese Unexamined Patent Application Publication No. 2006-11948, each optical reader includes an optical reader unit that emits a light beam to each optical ID tag and receives an optical signal reflected from the optical ID tag to read out identification information specific to the optical ID tag.

The optical ID tag includes a memory in which the specific identification information is stored, an optical converter that modulates the light beam emitted from the optical reader in accordance with the identification information stored in the memory to convert the modulated light beam into an optical signal, and a light reflector that reflects the light signal after the modulation in the incident direction of the light beam.

With the technology disclosed in Japanese Unexamined Patent Application Publication No. 2006-11948, the multiple optical ID tags that are arranged in proximity to each other in a space can be identified from remote locations, so that the optical readers can be used in the same manner as remote controllers to read the identification information concerning the optical ID tags.

SUMMARY OF THE INVENTION

However, the optical ID tag having the above structure has a problem in that, if multiple light beams have been emitted at similar angles of incidence, the identification information is not transmitted to the optical readers that have emitted the light beams at the similar angles of incidence or different pieces of identification information are simultaneously transmitted to the optical readers, because the reflected light beams converge in the incident direction (a congestion state).

Accordingly, it is desirable to provide an optical communication system, an optical reader, and a method of reading information which are capable of appropriately communicating identification information.

According to an embodiment of the present invention, an optical communication system includes at least one optical ID tag and at least one optical reader. Identification information is communicated between the optical ID tag and the optical reader using light as a communication medium. The optical ID tag includes: storing means for storing the identification information; reflecting means for reflecting incident light in the incident direction; and modulating means for modulating reflected light on the basis of the identification information stored in the storing means. The optical reader includes: random number generating means for generating a random number; emitting means for emitting light having an oscillation frequency specific to the generated random number; photoelectric conversion means for performing photoelectric conversion to the reflected light incident in the emitting direction; extracting means for extracting a signal component having the oscillation frequency from the signal resulting from the photoelectric conversion; and demodulating means for demodulating the signal component.

In this optical communication system, the optical reader can extract the identification information superimposed on the reflected light returned from the target optical ID tag as the feedback light even if the reflected light returned as the feedback light from the optical ID tag which is irradiated with the light emitted from the optical reader is congested with the reflected light from other optical ID tags. Accordingly, it is possible for the optical reader to read out the identification information stored in the target optical ID tag in the optical communication system even if other optical ID tags exist in the vicinity of the target optical ID tag and light is incident on the other optical ID tags at angles of incidence similar to the angle of the incidence of the target optical ID tag.

According to another embodiment of the present invention, an optical reader communicating with an optical ID tag, in which identification information is stored, using light as a communication medium includes: random number generating means for generating a random number; emitting means for emitting light having an oscillation frequency specific to the generated random number; photoelectric conversion means for performing photoelectric conversion to reflected light which is reflected from the optical ID tag in the emitting direction of the light emitted from the emitting means into the optical ID tag and which is modulated on the basis of the identification information; extracting means for extracting a signal component having the oscillation frequency from the signal resulting from the photoelectric conversion; and demodulating means for demodulating the signal component.

The optical reader can extract the identification information superimposed on the reflected light returned from the target optical ID tag as the feedback light even if the reflected light returned as the feedback light from the optical ID tag which is irradiated with the light emitted from the optical reader is congested with the reflected light from other optical ID tags. Accordingly, it is possible for the optical reader to read out the identification information stored in the target optical ID tag even if other optical ID tags exist in the vicinity of the target optical ID tag and light is incident on the other optical ID tags at angles of incidence similar to the angle of the incidence of the target optical ID tag.

According to yet another embodiment of the present invention, a method of reading identification information stored in an optical ID tag using light as a communication medium includes the steps of: generating a random number in random number generating means; emitting light having an oscillation frequency specific to the generated random number in emitting means; extracting, in extracting means, a signal component having the oscillation frequency from a signal resulting from photoelectric conversion to reflected light which is reflected from the optical ID tag in the emitting direction of the light emitted from the emitting means into the optical ID tag and which is modulated on the basis of the identification information; and demodulating the signal component in demodulating means.

With the method of reading identification information, the optical reader can extract the identification information superimposed on the reflected light returned from the target optical ID tag as the feedback light even if the reflected light returned as the feedback light from the optical ID tag which is irradiated with the light emitted from the optical reader is congested with the reflected light from other optical ID tags. Accordingly, it is possible for the optical reader to read out the identification information stored in the target optical ID tag even if other optical ID tags exist in the vicinity of the target optical ID tag and light is incident on the other optical ID tags at angles of incidence similar to the angle of the incidence of the target optical ID tag.

According to the present invention, the optical reader can read out the identification information stored in the target optical ID tag even if other optical ID tags exist in the vicinity of the target optical ID tag and light is incident on the other optical ID tags at angles of incidence similar to the angle of the incidence of the target optical ID tag. Consequently, it is possible to realize the optical communication system the optical reader, and the method of reading information, which are capable of appropriately communicating the identification information.

BRIEF DESCRIPTION OF THE DRAWINGS

FIG. 3 is a flowchart showing a modulation process according to an embodiment of the present invention;

DESCRIPTION OF THE PREFERRED EMBODIMENTS

Embodiments of the present invention now will be described in detail with reference to the attached drawings.

Structure of Optical Communication System

Figure 1:
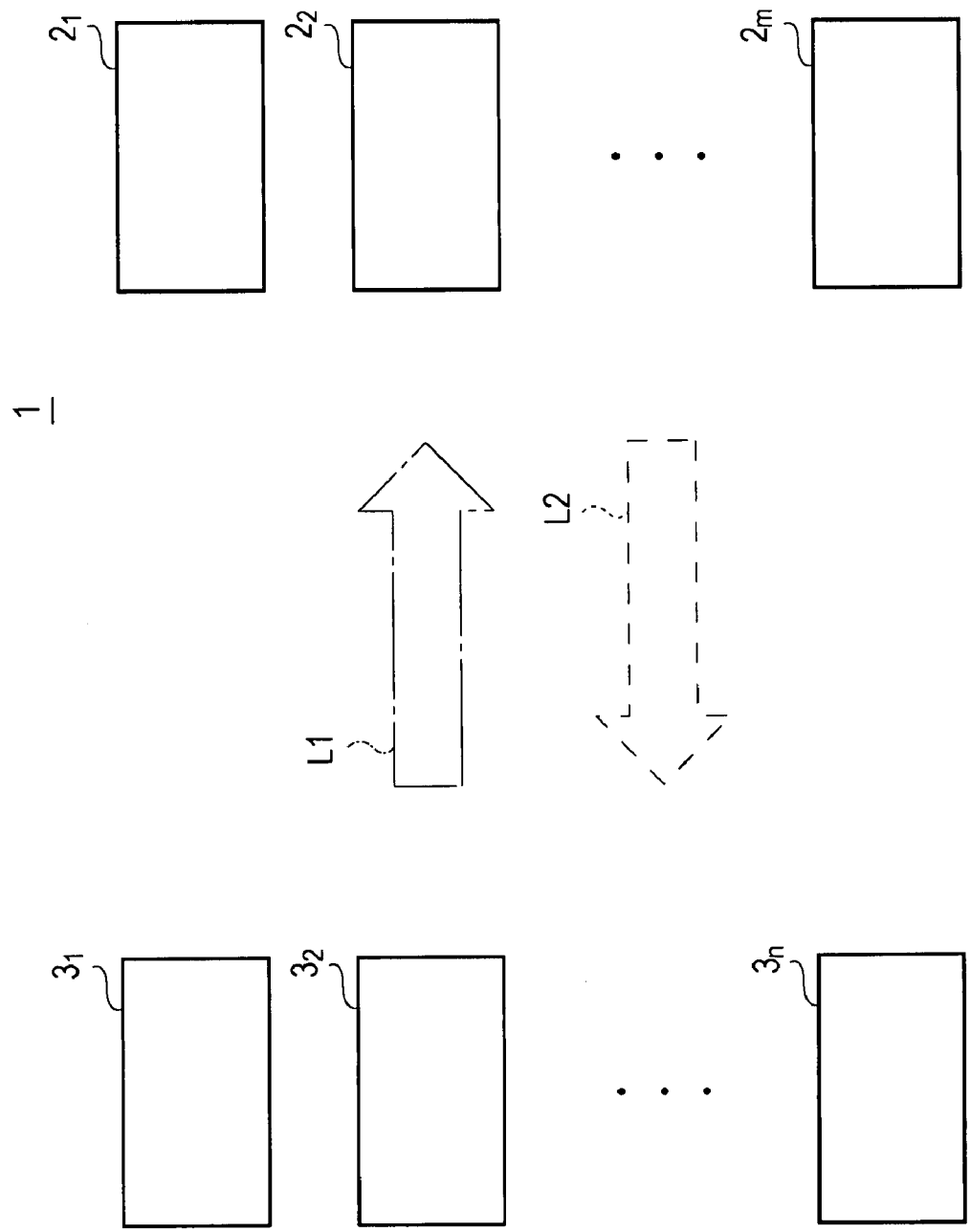
FIG. 1 shows an example of the entire structure of an optical communication system according to an embodiment of the present invention.

FIG. 1 shows an example of the entire structure of an optical communication system 1 according to an embodiment of the present invention. The optical communication system 1 includes multiple optical ID tags and multiple optical readers. Each optical ID tag is denoted by an optical ID tag $2_i$ ("i" is equal to 1, 2, 3, . . . , or m (m is an integer)), and each optical reader is denoted by an optical reader $3_j$ ("j" is equal to 1, 2, 3, . . . , or n (n is an integer)).

The optical ID tag $2_i$ is provided for a target article. Identification information concerning the target article is recorded in the optical ID tag $2_i$.

Specifically, for example, when the optical ID tags $2_1$ to $2_m$ are used to manage articles, the optical ID tag $2_i$ is provided for each article, and manufacturing information concerning the article, such as the serial number and the manufacturing date of the article, is stored in the optical ID tag $2i$ as the identification information.

When the optical ID tags $2_1$ to $2_m$ are used to provide information, the optical ID tag $2_i$ is provided for each advertising medium, and provision information concerning the advertising medium, such as an uniform resource locator (URL) of the Web page of a related company of the advertising medium and information concerning the advertised article, is stored in the optical ID tag $2_i$ as the identification information.

The optical ID tag $2_i$ reflects a light beam L1 with which the optical ID tag $2_i$ is irradiated in the emitting direction of the light beam L1 and modulates the light beam L1 on the basis of the identification information stored in the optical ID tag $2_i$ to return reflected light L2 resulting from the modulation.

The optical reader $3_j$ is manufactured as a dedicated mobile terminal or is mounted in a mobile terminal, such as a mobile phone or a personal digital assistant. The optical reader $3j$ is distributed to each user.

In order to read out the identification information stored in the optical ID tag $2_i$, the user directs the distributed optical reader $3_j$ emitting the light beam L1 toward the target optical ID tag $2_i$.

In this case, the optical reader $3_j$ extracts the identification information in the optical ID tag $2_i$, which is superimposed on the reflected light L2 returned from the target optical ID tag $2_i$ toward which the light beam L1 is emitted.

As described above, in the optical communication system 1, the user can use the optical reader $3_j$ as a remote controller.

Configuration of Optical ID Tag

Examples of the configurations of the optical ID tags $2_1$ to $2_m$ now will be described. Since the optical ID tags $2_1$ to $2_m$ have the same configuration, an example of the configuration of the optical ID tag $2_1$ now will be described with reference to FIG. 2 for convenience.

Figure 2:
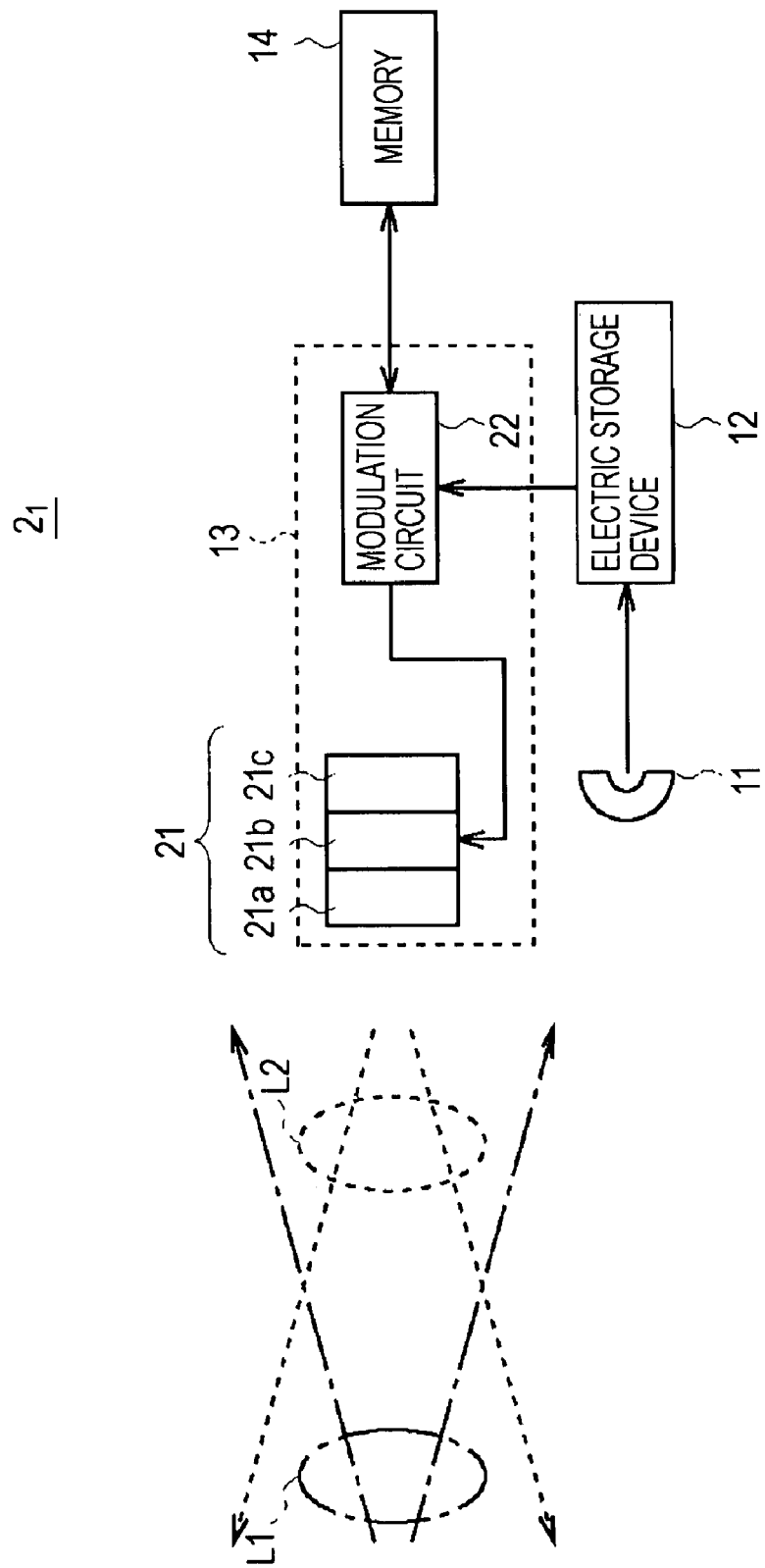
FIG. 2 is a block diagram showing an example of the configuration of an optical ID tag according to an embodiment of the present invention.

Referring to FIG. 2, the optical ID tag $2_1$ includes an optical receiver 11, an electric storage device 12, a reflected light converting unit 13, and a memory 14. The reflected light converting unit 13 includes an optical unit 21 and a modulation circuit 22. In the optical unit 21, a reflector plate 21a, a liquid crystal display (LCD) 21b, and a polarizing plate 21c are arranged sequentially. The modulation circuit 22 is connected to the LCD 21b and the memory 14.

For example, when the optical ID tag $2_1$ is irradiated with the light beam L1 emitted from the optical reader $3_1$, the optical receiver 11 performs photoelectric conversion to the light beam L1. The electric storage device 12 stores a voltage induced in the photoelectric conversion and, if the stored voltage exceeds a predetermined threshold, supplies the voltage to the modulation circuit 22 in the reflected light converting unit 13.

FIG. 3 is a flowchart showing a modulation process performed in the modulation circuit 22. After the modulation circuit 22 receives the voltage supplied from the electric storage device 12, then in Step SP0, the modulation circuit 22 starts the modulation process. In Step SP1, the modulation circuit 22 is activated by using the voltage supplied from the modulation circuit 22 as a drive voltage. In Step SP2, the modulation circuit 22 reads out identification information from the memory 14.

In Step SP3, the modulation circuit 22 modulates the voltage supplied from the electric storage device 12 in accordance with the identification information read out from the memory 14 according to a modulation method, for example, Manchester encoding, and supplies the modulation result to the LCD 21b in the optical unit 21. In the LCD 21b, the orientation of the liquid crystal molecules is varied with the voltage varied in accordance with the identification information.

The modulation circuit 22 continues to vary the orientation of the liquid crystal molecules in the LCD 21b until the voltage supply from the electric storage device 12 is stopped. In Step SP4, the modulation circuit 22 determines whether the voltage supply from the electric storage device 12 is stopped. If the modulation circuit 22 determines that the voltage supply from the electric storage device 12 is stopped, then in Step SP5, the modulation circuit 22 terminates the modulation process.

In the optical unit 21, in the reflected light converting unit 13, only certain polarized components in the light beam L1 emitted from the optical reader $3_1$ pass through the polarizing plate 21c. The light filtered in the polarizing plate 21c is reflected from the reflector plate 21a in the incident direction into the reflector plate 21a (that is, toward the target optical reader $3_1$).

The light reflected from the reflector plate 21a in the incident direction varies its polarization state in accordance with the orientation of the liquid crystal molecules in the LCD 21b. The light of an amount corresponding to the polarization state is emitted through the polarizing plate 21c as the reflected light L2.

Figure 4A:
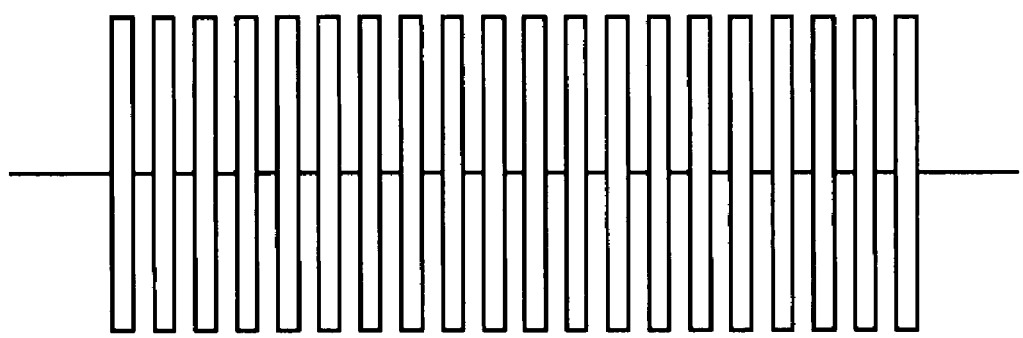
FIGS. 4A and 4B schematically show a variation in the amount of light between emitted light and feedback light.
Figure 4B:
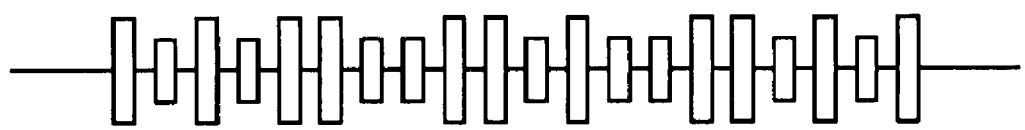

Accordingly, if the light beam L1 of a predetermined amount per unit of time is emitted from the optical reader $3_1$ into the reflected light converting unit 13, as shown in an example in FIG. 4A, the reflected light L2 from the optical ID tag $2_1$ which is irradiated with the light beam L1 is varied in accordance with the identification information stored in the memory 14, as shown in an example in FIG. 4B.

As described above, when the voltage supply is stopped, the optical ID tag $2_1$ varies the amount of reflected light L2 of the light beam L1 emitted from the optical reader $3_1$ in accordance with the identification information stored in the memory 14 and superimposes the identification information on the reflected light L2 in order to transmit the identification information to the optical reader $3_1$.

In the optical ID tag $2_1$ according to this embodiment of the present invention, the optical receiver 11, the electric storage device 12, the reflected light converting unit 13, and the memory 14 are housed in a thin case made of resin. Accordingly, it is possible to prevent dust or moisture from entering into the case, and an user can easily carry the optical ID tag $2_1$ included in the case.

Figure 5A:
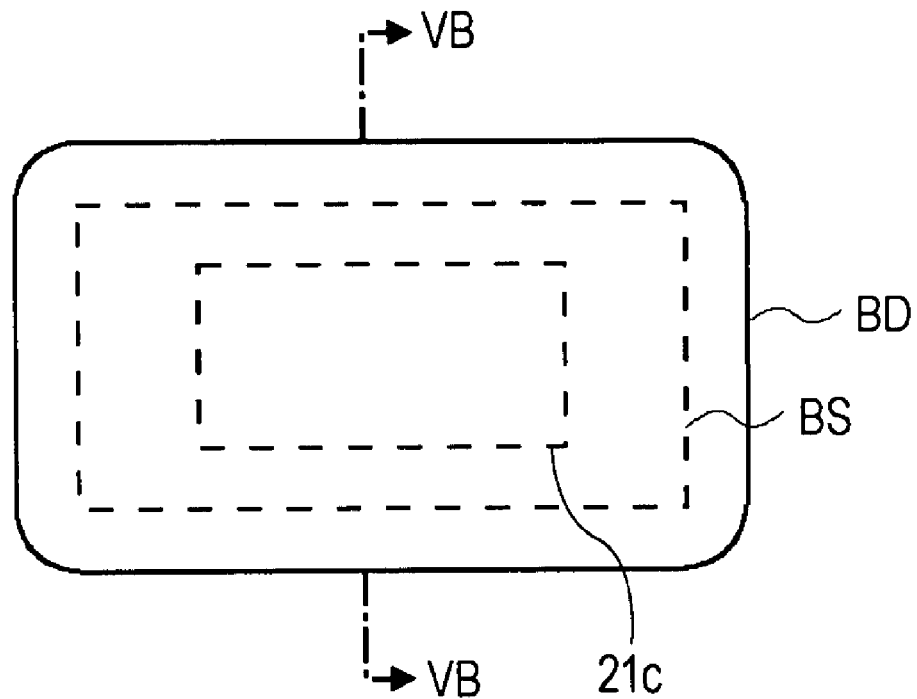
FIGS. 5A and 5B show how the optical ID tag is housed according to an embodiment of the present invention.
Figure 5B:
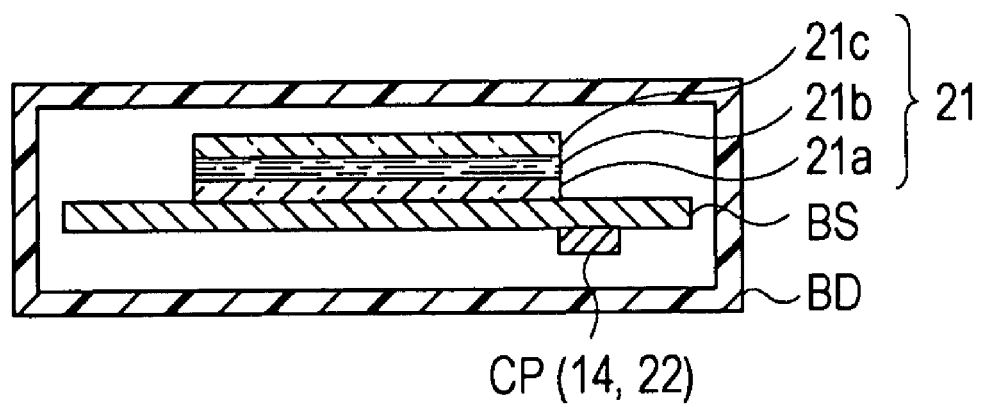

Specifically, for example, the electric storage device 12 is provided at a predetermined position on a substrate BS in a thin rectangular case BD, and the optical receiver 11 is provided at a predetermined position on one surface (the surface on which the light beam L1 is incident) of the substrate BS, as shown in FIGS. 5A and 5B. The optical unit 21 is provided in the central part of the substrate BS, which is close to the optical receiver 11. The modulation circuit 22 and the memory 14 are provided at a predetermined position on the other surface of the substrate BS as an IC chip CP.

In the structure shown in FIGS. 5A and 5B, the light beam L1 emitted from the optical reader $3_j$ is incident on only one surface of the case BD in the thickness direction, so that it is possible to ensure a larger mounting area for the optical unit 21 and the optical receiver 11, compared with a case where both the IC chip CP and the optical unit 21 are provided on the same surface of the substrate BS.

Configuration of Optical Reader

Examples of the configurations of the optical readers $3_1$ to $3_n$ now will be described. Since the optical readers $3_1$ to $3_n$ have the same configuration, an example of the configuration of the optical reader $3_1$ now will be described with reference to FIG. 6 for convenience.

Figure 6:
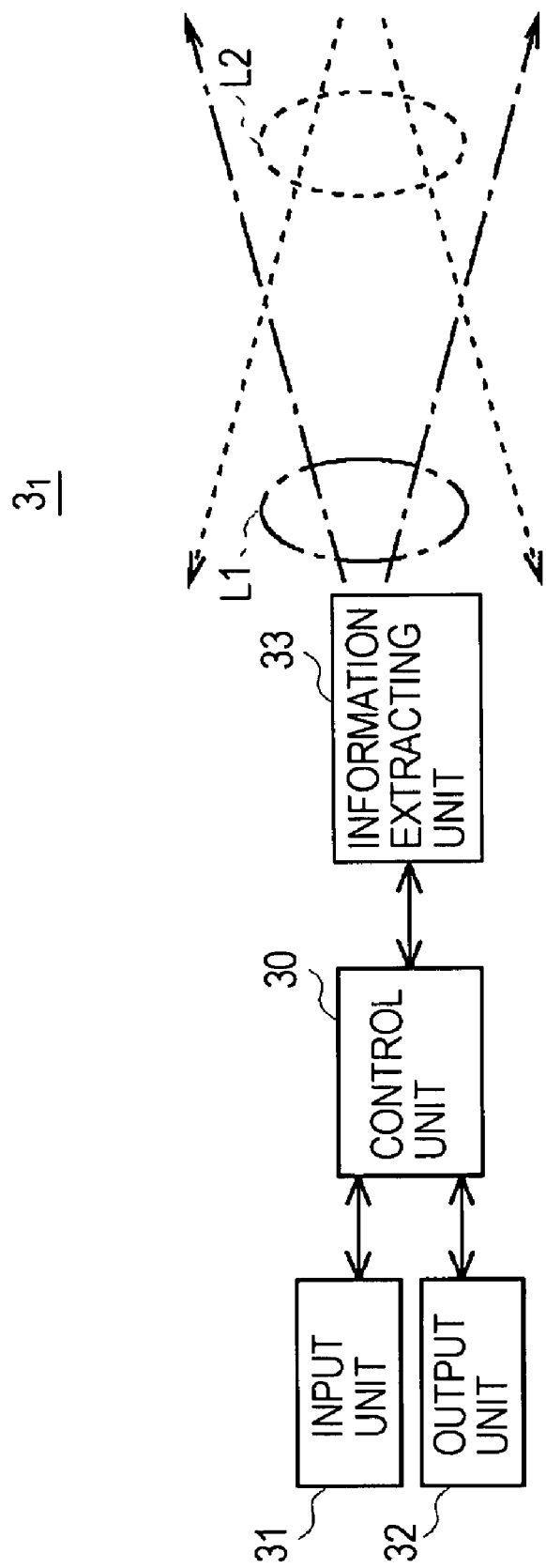
FIG. 6 is a block diagram showing an example of the configuration of an optical reader according to an embodiment of the present invention.

Referring to FIG. 6, the optical reader $3_1$ includes a control circuit 30, an input unit 31, an output unit 32, and an information extracting unit 33. The input unit 31, the output unit 32, and the information extracting unit 33 are connected to the control circuit 30. The control circuit 30 controls the entire optical reader $3_1$. The input unit 31 receives various instructions corresponding to user operations. The output unit 32 visibly and acoustically indicates the content of processes in response to the instructions and the user operations. The information extracting unit 33 emits the light beam L1 and extracts the identification information superimposed on the feedback light of the light beam L1.

The control circuit 30 is a microcomputer including a central processing unit (CPU), a read only memory (ROM), a random access memory (RAM), a clock generator, and a flash memory.

When the input unit 31 receives an instruction to read out the identification information, the control circuit 30 extracts the identification information recorded in the optical ID tag 2 through the information extracting unit 33 to store the identification information in the flash memory and to indicate the content of the identification information through the output unit 32.

Figure 7:
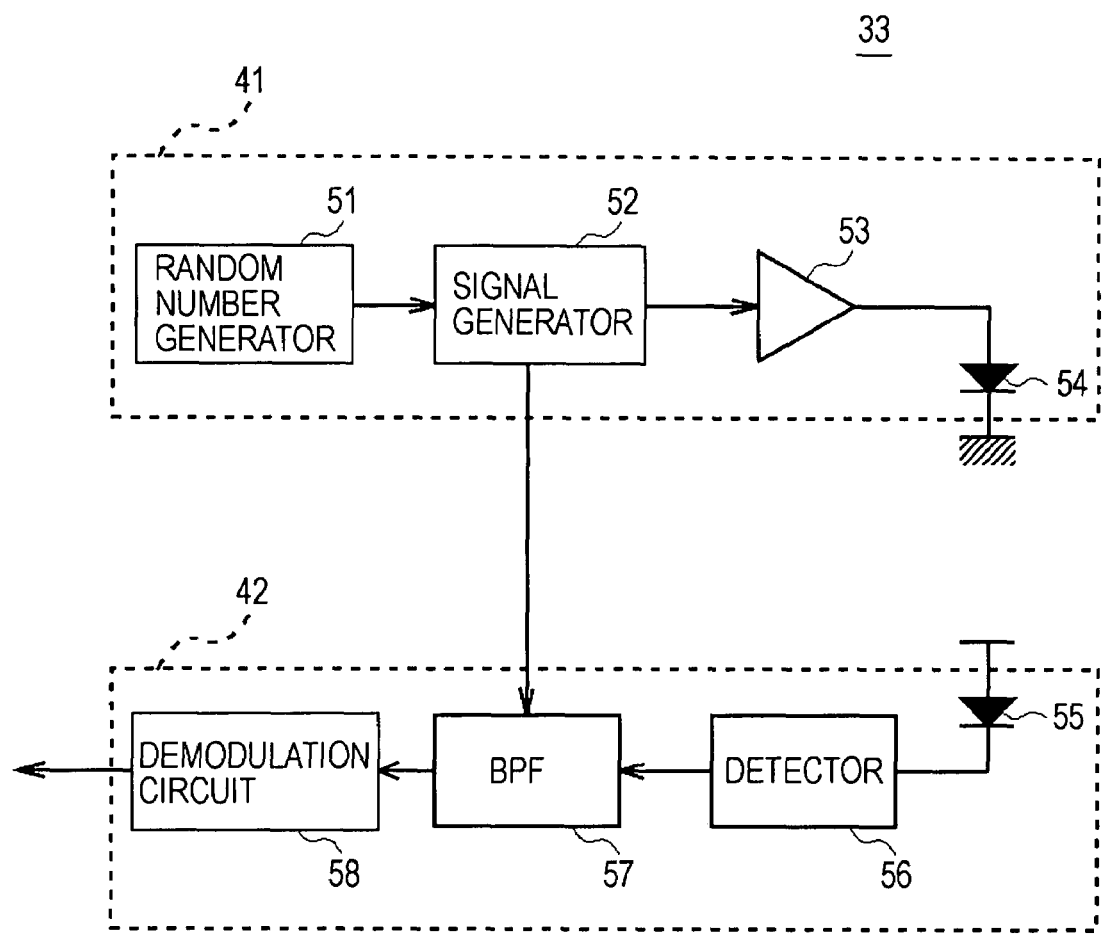
FIG. 7 is a block diagram showing an example of the configuration of an information extracting unit in the optical reader according to an embodiment of the present invention.

FIG. 7 is a block diagram showing an example of the configuration of the information extracting unit 33 according to an embodiment of the present invention. Referring to FIG. 7, the information extracting unit 33 includes a transmission processing section 41 and a reception processing section 42.

The transmission processing section 41 includes a random number generator 51, a signal generator 52, an amplifier 53, and a light emitting diode (LED) 54. The random number generator 51 generates a random number in response to each control instruction supplied from the control circuit 30 (FIG. 6) and supplies the generated random number to the signal generator 52.

The signal generator 52 includes a table showing the correspondence between the random numbers and oscillation frequencies. The signal generator 52 selects an oscillation frequency corresponding to the random number supplied from the random number generator 51 on the basis of this table and supplies the value of the selected oscillation frequency to the reception processing section 42.

In addition, the signal generator 52 generates a signal having the selected oscillator frequency and applies the generated signal to the LED 54 through the amplifier 53. As a result, the LED 54 emits the light beam L1 (FIG. 6) having the oscillation frequency corresponding to the random number.

In the manner described above, the transmission processing section 41 can emit light beams L1 having different oscillation frequencies each time the control instruction is received.

The reception processing section 42 includes a photodiode (PD) 55, a detector 56, a bandpass filter (BPF) 57, and a demodulation circuit 58. The PD 55 performs the photoelectric conversion to the reflected light L2 (FIG. 6) which is reflected from the optical ID tag 2 and on which the identification information is superimposed and supplies an alternating current signal resulting from the photoelectric conversion to the detector 56.

The detector 56 detects the alternating current signal and supplies the envelope of the detected alternating current signal to the BPF 57 as a detected signal.

The BPF 57 sets a value of the oscillation frequency of the signal supplied from the signal generator 52 in the transmission processing section 41. The BPF 57 extracts a signal component having the set oscillation frequency from the detected signal supplied from the detector 56 and supplies the extracted signal component to the demodulation circuit 58.

The demodulation circuit 58 performs a demodulation process corresponding to the same modulation method as in the modulation circuit 22 (FIG. 2) in the optical ID tag 2 to the signal component supplied from the BPF 57 and supplies the identification information resulting from the demodulation to the control circuit 30 (FIG. 6). The identification information is stored in the flash memory in the control circuit 30 (FIG. 6).

In the manner described above, the reception processing section 42 can extract the identification information which is superimposed on the reflected light L2 from the reflected light L2 (FIG. 6) of the light beam L1 (FIG. 6) that is emitted from the transmission processing section 41.

Process of Extracting Information

Figure 8:
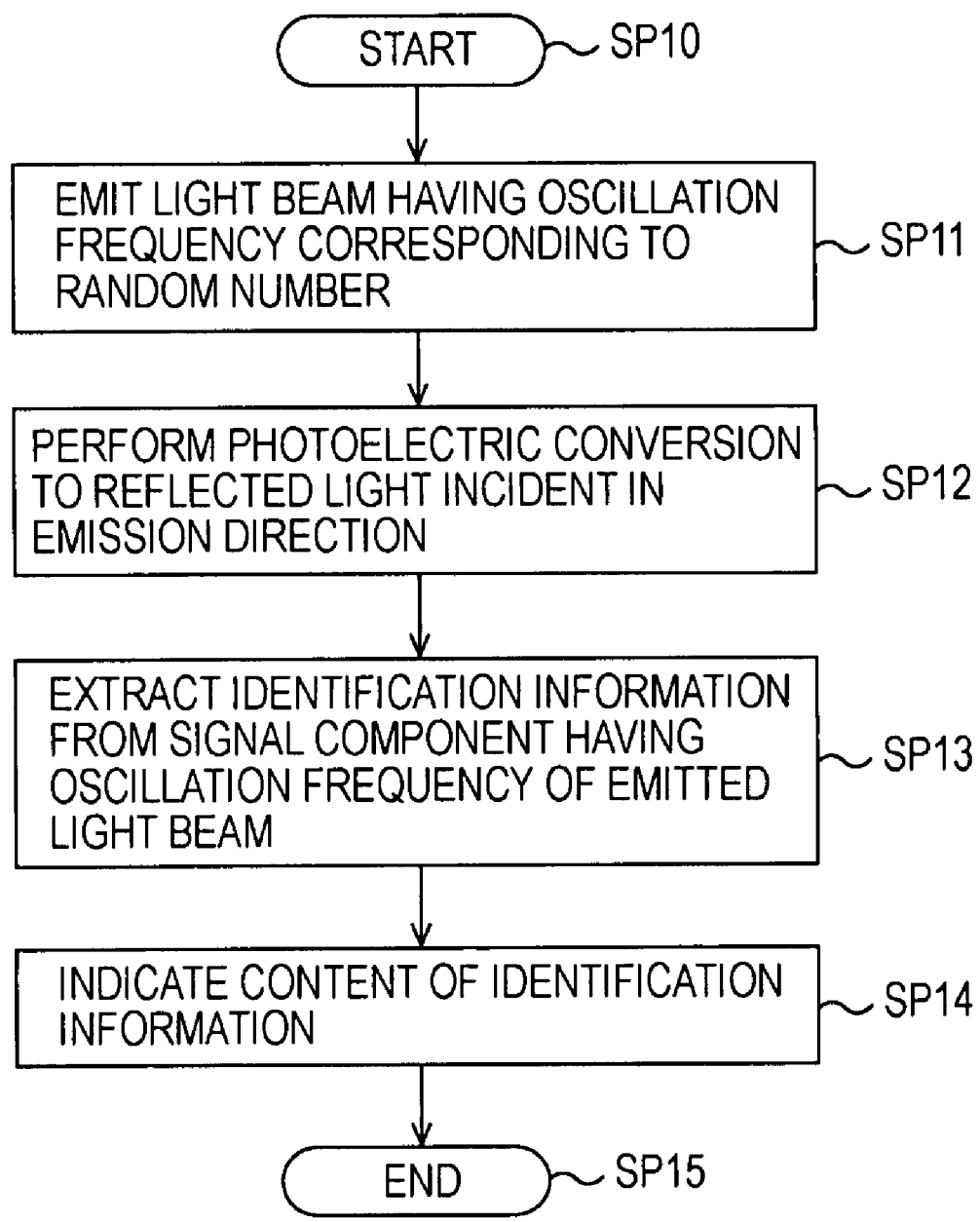
FIG. 8 is a flowchart showing a process of extracting information according to an embodiment of the present invention.

FIG. 8 is a flowchart showing a process of extracting information in the control circuit 30 in the optical reader $3_1$ described above. It is assumed that the optical reader $3_1$ is directed to the optical ID tag $2_1$, among the optical ID tags $2_1$ to $2_m$ (FIG. 1), that is, the optical reader $3_1$ reads the identification information from the optical ID tag $2_1$.

Figure 9:
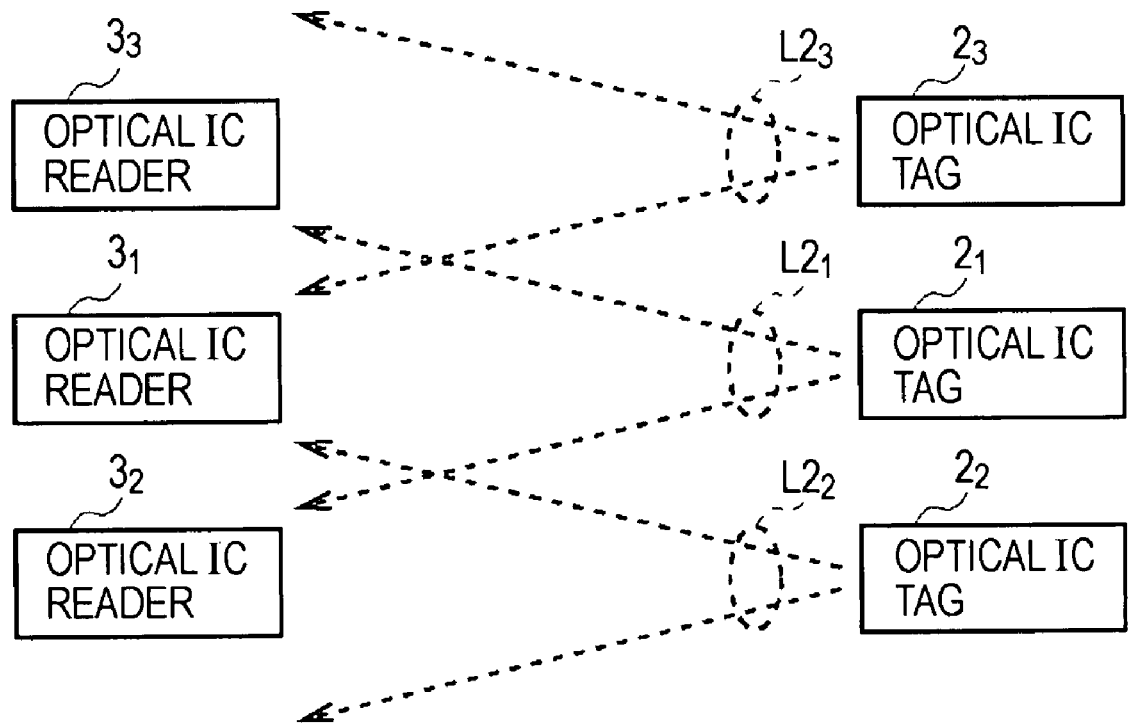
FIG. 9 schematically shows congestion of the feedback light.

As shown in FIG. 9, it is also assumed that, for example, the optical ID tag $2_2$ and the optical ID tag $2_3$ exist in the vicinity of the optical ID tag $2_1$ and that optical readers $3_2$ and $3_3$ read out the identification information from the optical ID tag $2_2$ and $2_3$ at angles of incidence similar to the angle of incidence of the optical reader $3_1$.

Referring to FIG. 8, after the control circuit 30 receives an instruction to read out the identification information from the input unit 31, then in Step SP10, the control circuit 30 starts the process of extracting information. In Step SP11, the control circuit 30 controls the random number generator 51 (FIG. 7) so as to generate a random number and controls the signal generator 52 (FIG. 7) so as to emit a signal having the oscillation frequency corresponding to the generated random number in order to cause the LED 54 in the transmission processing section 41 (FIG. 7) to emit the light beam L1 (FIG. 6) having the oscillation frequency corresponding to the random number.

The optical ID tag $2_1$ is irradiated with the light beam L1 and returns a reflected light $L2_1$ (FIG. 9) on which the identification information stored in the optical ID tag $2_1$ is superimposed. As shown in FIG. 9, the reflected light $L2_1$ is congested with reflected light beams $L2_2$ and $L2_3$ incident from the optical ID tag $2_2$ and $2_3$ into the optical reader $3_2$ and $3_3$. As a result, the reflected light $L2_1$ which is congested with the reflected light beams $L2_2$ and $L2_3$ is incident into the optical reader $3_1$.

In Step S12, the control circuit 30 performs the photoelectric conversion to the reflected light $L2_1$ incident in the emitting direction in Step SP11. In Step SP13, on the basis of the result of the photoelectric conversion, the control circuit 30 controls the reception processing section 42 (FIG. 7) so as to extract the identification information from the signal component which has the oscillation frequency of the light beam L1 emitted in Step SP11 and on which the identification information is superimposed.

In Step SP14, the control circuit 30 controls the output unit 32 so as to indicate the content of the extracted identification information. In Step SP15, the control circuit 30 terminates the process of extracting information.

As described above, the control circuit 30 emits the light beam $L1_1$ having the oscillation frequency corresponding to the random number and extracts the identification information from the signal component having the oscillation frequency in the received reflected light $L2_1$. Accordingly, it is possible to properly acquire the identification information stored in the target optical ID tag $2_1$ and to indicate the acquired identification information even if the reflected light $L2_1$ is congested with the reflected light beams $L2_2$ and $L_3$.

Operations and Advantages

In the configurations described above, the optical reader $3_j$ in the optical communication system 1 generates a random number in accordance with the reading operation and emits a light beam having an oscillation frequency specific to the generated random number through the LED 54 (FIG. 7).

The optical reader $3_j$ performs the photoelectric conversion to the reflected light which is reflected from the optical ID tag $2_i$ in the emitting direction of the light emitted from the LED 54 into a predetermined optical ID tag $2_i$ and which is modulated on the basis of the identification information in the PD 55 (FIG. 7). The optical reader $3_j$, then, extracts a signal component having the oscillation frequency from the signal resulting from the photoelectric conversion through the BPF 57 (FIG. 7) and demodulates the signal component in the demodulation circuit 58 (FIG. 7).

Accordingly, the optical reader $3_j$ can extract the identification information that is superimposed on the reflected light returned from the target optical ID tag $2_1$ (FIG. 9) as feedback light, even if the reflected light returned from the target optical ID tag $2_1$ as the feedback light is congested with the reflected light from the optical ID tags $2_2$ and $2_3$ (FIG. 9).

Consequently, in the optical communication system 1, it is possible for the optical reader $3_1$ to read out the identification information stored in the target optical ID tag $2_1$ even if the optical ID tags $2_2$ and $2_3$ exist in the vicinity of the optical ID tag $2_1$ and the optical ID tags $2_2$ and $2_3$ are irradiated with light at angles of incidence similar to the angle of incidence of the optical ID tag $2_1$, for example, if the optical ID tag $2_i$ is provided on an advertising poster hung in a train and multiple users simultaneously read out identification information stored in the optical ID tag $2_i$ using their own optical readers $3_j$. As a result, it is possible to lighten restrictions on the arrangement of the optical ID tag $2_i$ in the optical communication system 1.

With the above configurations, it is possible to realize the optical communication system 1 capable of appropriately communicating the identification information regardless of how the optical ID tag $2_i$ is arranged or the readout state of the optical ID tag $2_i$ by the optical reader $3_j$.

It should be understood by those skilled in the art that various modifications, combinations, subcombinations and alterations may occur depending on design requirements and other factors insofar as they are within the scope of the appended claims or the equivalents thereof.

What is claimed is:

1. An optical communication system comprising:
   at least one optical ID tag; and
   at least one optical reader,
   wherein identification information is communicated between the optical ID tag and the optical reader using light as a communication medium,
   wherein the optical ID tag includes
      storing means for storing the identification information;
      reflecting means for reflecting incident light in the incident direction; and
      modulating means for modulating reflected light on the basis of the identification information stored in the storing means, and
   wherein the optical reader includes
      random number generating means for generating a random number;
      emitting means for emitting light having an oscillation frequency specific to the generated random number;
      photoelectric conversion means for performing photoelectric conversion to the reflected light incident in the emitting direction;
      extracting means for extracting a signal component having the oscillation frequency from the signal resulting from the photoelectric conversion; and
      demodulating means for demodulating the signal component.

2. An optical reader communicating with an optical ID tag, in which identification information is stored, using light as a communication medium, the optical reader comprising:
   random number generating means for generating a random number;
   emitting means for emitting light having an oscillation frequency specific to the generated random number;
   photoelectric conversion means for performing photoelectric conversion to reflected light which is reflected from the optical ID tag in the emitting direction of the light emitted from the emitting means into the optical ID tag and which is modulated on the basis of the identification information;
   extracting means for extracting a signal component having the oscillation frequency from the signal resulting from the photoelectric conversion; and
   demodulating means for demodulating the signal component.

3. The optical reader according to claim 2,
   wherein the photoelectric conversion means performs the photoelectric conversion to the reflected light which is returned from an arbitrary optical ID tag, among a plurality of adjacent optical ID tags, which is irradiated with the light emitted by the emitting means.

4. The optical reader according to claim 2,
   wherein the random number generating means generates the random number each time an instruction input with an input means is received in response to a reading operation.

5. The optical reader according to claim 2, further comprising:
   indicating means for indicating the identification information resulting from the demodulation in the demodulating means.

6. A method of reading identification information stored in an optical ID tag using light as a communication medium, the method comprising the steps of:
   generating a random number in random number generating means;
   emitting light having an oscillation frequency specific to the generated random number in emitting means;
   extracting, in extracting means, a signal component having the oscillation frequency from a signal resulting from photoelectric conversion to reflected light which is reflected from the optical ID tag in the emitting direction of the light emitted from the emitting means into the optical ID tag and which is modulated on the basis of the identification information; and
   demodulating the signal component in demodulating means.

7. An optical communication system comprising:
   at least one optical ID tag; and
   at least one optical reader,
   wherein identification information is communicated between the optical ID tag and the optical reader using light as a communication medium,
   wherein the optical ID tag includes
      a storing unit in which the identification information is stored;
      a reflecting unit that reflects incident light in the incident direction; and
      a modulating unit that modulates reflected light on the basis of the identification information stored in the storing unit, and
   wherein the optical reader includes
      a random number generating unit that generates a random number;
      an emitting unit that emits light having an oscillation frequency specific to the generated random number;
      a photoelectric conversion unit that performs photoelectric conversion to the reflected light incident in the emitting direction;
      an extracting unit that extracts a signal component having the oscillation frequency from the signal resulting from the photoelectric conversion; and
      a demodulating unit that demodulates the signal component.

8. An optical reader communicating with an optical ID tag, in which identification information is stored, using light as a communication medium, the optical reader comprising:
   a random number generating unit that generates a random number;
   an emitting unit that emits light having an oscillation frequency specific to the generated random number;
   a photoelectric conversion unit that performs photoelectric conversion to reflected light which is reflected from the optical ID tag in the emitting direction of the light emitted from the emitting unit into the optical ID tag and which is modulated on the basis of the identification information;
   an extracting unit that extracts a signal component having the oscillation frequency from the signal resulting from the photoelectric conversion; and
   a demodulating unit that demodulates the signal component.

* * * * *